(12) United States Patent
Saito et al.

(10) Patent No.: US 9,470,940 B2
(45) Date of Patent: Oct. 18, 2016

(54) SEMICONDUCTOR DEVICE AND METHOD FOR FABRICATING SEMICONDUCTOR DEVICE

(71) Applicant: FUJITSU SEMICONDUCTOR LIMITED, Yokohama-shi, Kanagawa (JP)

(72) Inventors: Tomiyasu Saito, Kuwana (JP); Tatsuya Mise, Aizuwakamatsu (JP); Yoshio Matsuzawa, Aizuwakamatsu (JP); Tetsuya Takeuchi, Aizuwakamatsu (JP)

(73) Assignee: FUJITSU SEMICONDUCTOR LIMITED, Yokohama (JP)

( * ) Notice: Subject to any disclaimer, the term of this patent is extended or adjusted under 35 U.S.C. 154(b) by 4 days.

(21) Appl. No.: 14/517,376

(22) Filed: Oct. 17, 2014

(65) Prior Publication Data
US 2015/0160499 A1    Jun. 11, 2015

(30) Foreign Application Priority Data

Dec. 10, 2013   (JP) ................................ 2013-255301

(51) Int. Cl.
| H01L 31/02 | (2006.01) |
| G02F 1/1333 | (2006.01) |
| G02F 1/1343 | (2006.01) |
| G02F 1/1362 | (2006.01) |

(52) U.S. Cl.
CPC ..... *G02F 1/13439* (2013.01); *G02F 1/136277* (2013.01)

(58) Field of Classification Search
None
See application file for complete search history.

(56) References Cited

U.S. PATENT DOCUMENTS

| 6,795,144 | B1 | 9/2004 | Okuda et al. | |
| 7,486,357 | B2* | 2/2009 | Jang | G02F 1/136209 349/111 |
| 2002/0036726 | A1* | 3/2002 | Choo | G02F 1/133553 349/43 |
| 2012/0202312 | A1* | 8/2012 | Suzuki | H01L 27/14687 438/73 |

FOREIGN PATENT DOCUMENTS

| JP | 2001-242485 A | 9/2001 |
| JP | 2006-58680 A | 3/2006 |
| JP | 2007-193200 A | 8/2007 |

\* cited by examiner

*Primary Examiner* — Pamela E Perkins
(74) *Attorney, Agent, or Firm* — Westerman, Hattori, Daniels & Adrian, LLP

(57) ABSTRACT

A semiconductor device includes a first electrode layer and a second electrode layer disposed over a substrate, a first insulating layer disposed over the first electrode layer, and a reflective electrode layer disposed on the first insulating layer and electrically connected to the first electrode layer, wherein the second electrode layer is exposed externally, and a thickness of the second electrode layer is greater than a thickness of the reflective electrode layer.

6 Claims, 21 Drawing Sheets

SEMICONDUCTOR DEVICE AND METHOD FOR FABRICATING SEMICONDUCTOR DEVICE

CROSS-REFERENCE TO RELATED APPLICATIONS

This application is based upon and claims the benefit of priority of the prior Japanese Patent Application No. 2013-255301, filed on Dec. 10, 2013, the entire contents of which are incorporated herein by reference.

FIELD

The present invention relates to a semiconductor device and a method for fabricating the semiconductor device.

BACKGROUND

Recent years have seen the development of a reflective liquid crystal display device referred to as a silicon-chip-based liquid crystal device for use as a head-mounted display or a projection display.

This type of reflective liquid crystal display device displays an image by shining light from a light source onto a liquid crystal panel and by projecting the reflected light from the liquid crystal panel onto a screen.

A unit constructed by forming as a silicon chip a semiconductor device for driving a liquid crystal panel and by mounting the liquid crystal panel on the semiconductor device is referred to as, for example, an LCOS (Liquid Crystal On Silicon) unit.

FIG. 1 is a diagram illustrating an LCOS unit according to the prior art. The LCOS unit 130 includes a liquid crystal panel 120 and a semiconductor device 110 as a silicon chip for driving the liquid crystal panel 120.

The semiconductor device 110 is formed on a silicon substrate 111, and includes a device layer 112 which contains circuit elements such as transistors T. The semiconductor device 110 further includes reflective electrode layers 115 each of whose electric potential is controlled by a signal from the device layer 112, and a bonding pad 114 which is used for supplying power to the device layer 112 as well as for transferring signals to and from an external circuit.

The reflective electrode layers 115 are arranged in a two-dimensional matrix array. A desired image is displayed by controlling the electric potential of each reflective electrode layer 115 and hence controlling the orientation of the liquid crystal in the liquid crystal panel 120.

In the example illustrated in FIG. 1, the reflective electrode layers 115 and the bonding pad 114 are disposed in the uppermost layer of the semiconductor device 110, and have the same thickness because they are formed simultaneously in the same process step by etching the same conductive layer.

Japanese Laid-open Patent Publication No. 2001-242485
Japanese Laid-open Patent Publication No. 2007-193200
Japanese Laid-open Patent Publication No. 2006-58680

SUMMARY

To enhance the display performance of the reflective liquid crystal display device, there is a need to increase the image resolution and brightness and, to achieve this, further miniaturization of the pixel size is being studied.

To this end, a study is being conducted in an effort to further reduce the size of the reflective electrode layer corresponding to each individual pixel. By reducing the area size of the reflective electrode layer, the pixel size can be further reduced, which serves to enhance the image resolution.

It is an object of the present invention to provide a semiconductor device fabrication method that can solve a variety of problems that can arise when miniaturizing the pixel size.

It is another object of the present invention to provide a semiconductor device that can solve a variety of problems that can arise when miniaturizing the pixel size.

According to an aspect of the embodiment disclosed in this specification, there is provided a semiconductor device fabrication method which includes: forming a first electrode layer and a second electrode layer over a substrate; forming a first insulating layer on the first electrode layer and second electrode layer; forming a reflective electrode layer, that is electrically connected to the first electrode layer, on the first insulating layer; forming a second insulating layer on the reflective electrode layer and a portion of the first insulating layer above the second electrode layer; exposing the second electrode layer by etching the second insulating layer and the first insulating layer located above the second electrode layer with the second insulating layer left on the reflective electrode layer; and after exposing the second electrode layer, exposing the reflective electrode layer by etching the second insulating layer located on the reflective electrode layer.

According to an aspect of the embodiment disclosed in this specification, there is provided an alternative semiconductor device fabrication method which includes: forming a first electrode layer and a second electrode layer over a substrate; forming a first insulating layer on the first electrode layer and second electrode layer; forming a reflective electrode layer, that is electrically connected to the first electrode layer, on the first insulating layer; forming a second insulating layer on the reflective electrode layer and a portion of the first insulating layer above the second electrode layer; etching the second insulating layer and a portion of the first insulating layer located above the second electrode layer in a depth direction, with the second insulating layer left on the reflective electrode layer; and after etching the portion of the first insulating layer, exposing the second electrode layer by etching the first insulating layer left on the second electrode layer, and exposing the reflective electrode layer by etching the second insulating layer located on the reflective electrode layer.

According to an aspect of the embodiment disclosed in this specification, there is also provided a semiconductor device which includes: a first electrode layer and a second electrode layer disposed over a substrate; a first insulating layer disposed over the first electrode layer; and a reflective electrode layer disposed on the first insulating layer and electrically connected to the first electrode layer, and wherein the second electrode layer is exposed externally, and a thickness of the second electrode layer is greater than a thickness of the reflective electrode layer.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
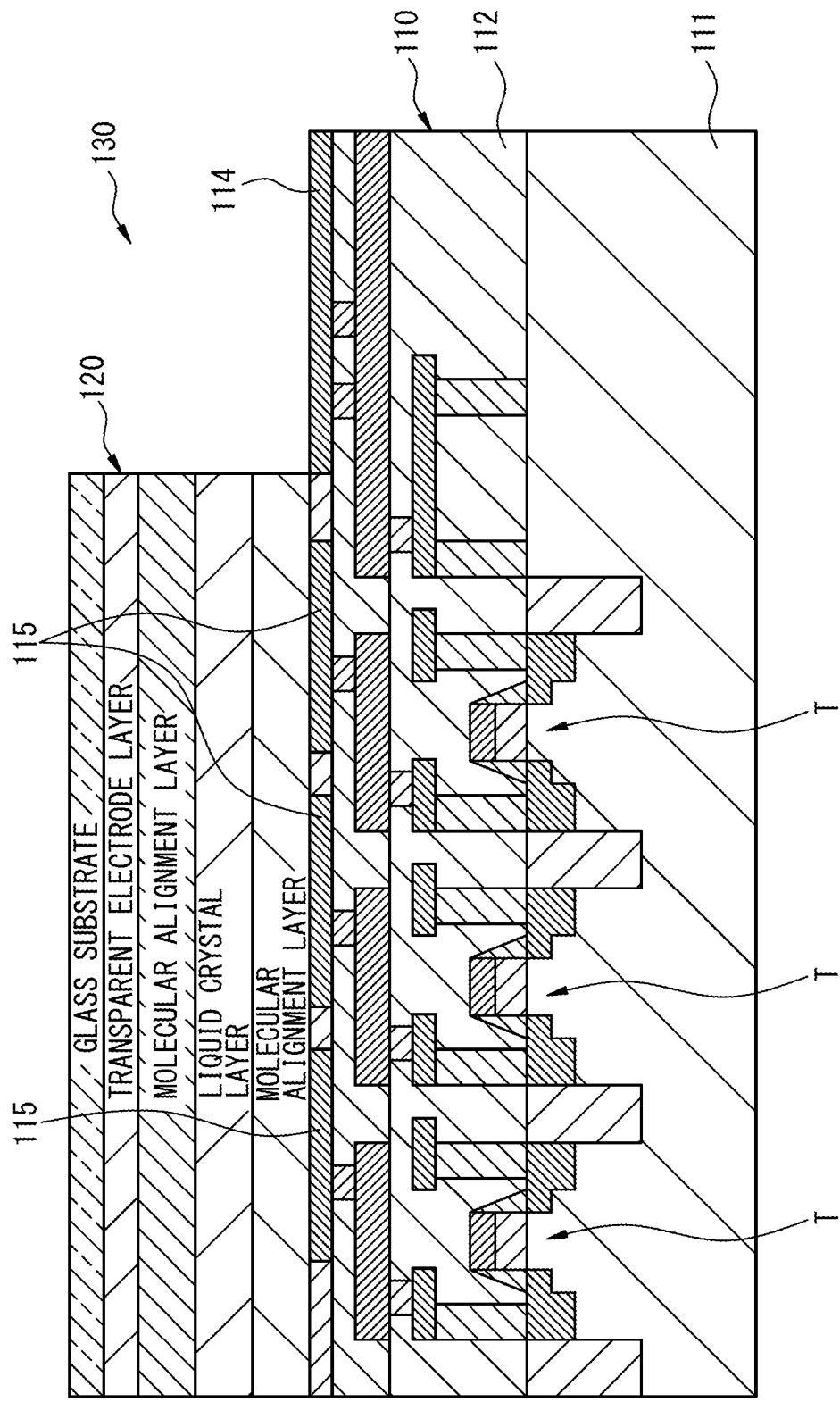
FIG. 1 is a diagram illustrating an LCOS unit according to the prior art.

In the prior art LCOS unit illustrated in FIG. 1, the brightness can be increased, for example, by reducing the area size of each individual reflective electrode layer thereby reducing the spacing between the reflective electrode layers and increasing the total area of the reflective electrode layers arranged in a matrix array.

When the area size of each reflective electrode layer is reduced using miniaturization technology, the thickness of the reflective electrode layer is also reduced.

Since the bonding pad 114 depicted in FIG. 1 has the same thickness as the reflective electrode layers, miniaturizing the reflective electrode layers results in reducing the thickness of the bonding pad 114.

The bonding pad 114 is an electrode connected to an external circuit by using bonding technology such as wire bonding. Since external mechanical stresses are applied to the bonding bad 114 in the wire bonding and other process steps, the bonding pad 114 needs to have sufficient mechanical strength to withstand such external stresses.

However, when the reflective electrode layers are miniaturized in order to enhance the display performance of the reflective liquid crystal display device, the mechanical strength of the bonding pad is decreased because the thickness of the bonding pad decreases.

In view of the above, the present invention proposes a semiconductor device that solves a variety of problems that can arise when fabricating a semiconductor device having miniaturized pixel size, and a method for fabricating such a semiconductor device.

One preferred embodiment of the semiconductor device disclosed in this specification will be described below with reference to drawings. It will, however, be noted that the technical scope of the present invention is not limited by any specific embodiment described herein but extends to the inventions described in the appended claims and their equivalents.

Figure 2:
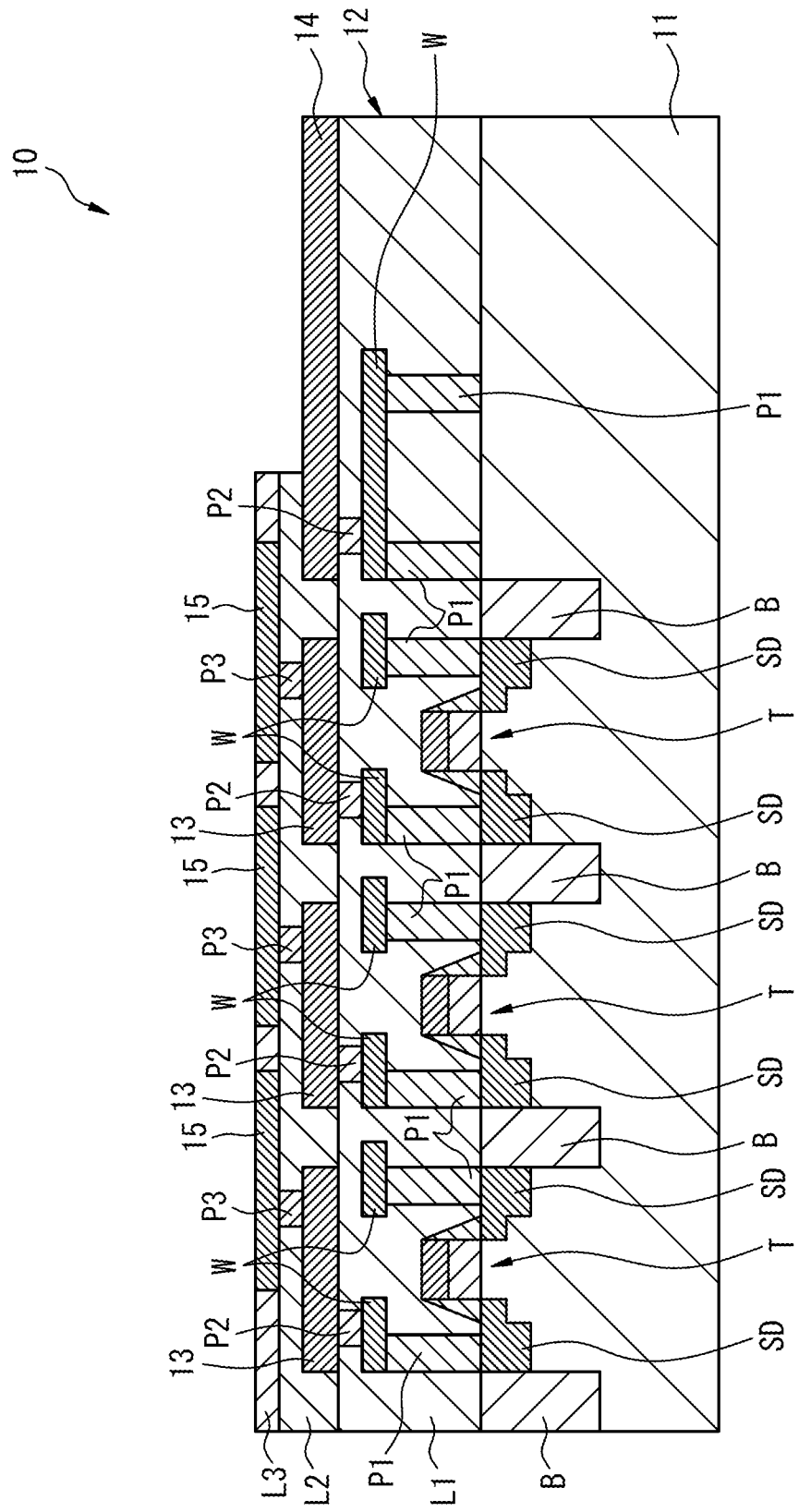
FIG. 2 is a diagram illustrating one embodiment of a semiconductor device disclosed in this specification.
Figure 3A:
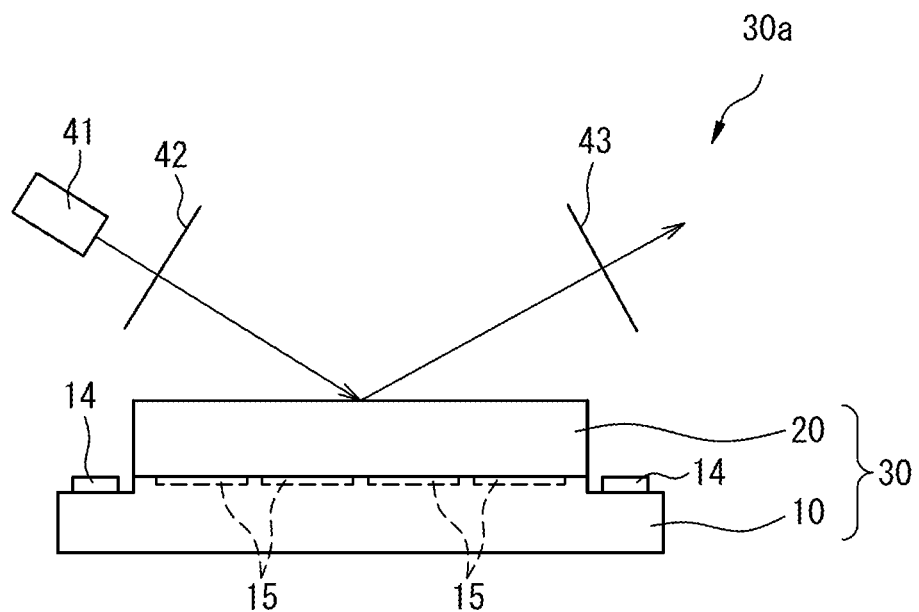
FIG. 3A is a diagram illustrating a condition in which the semiconductor device depicted in FIG. 2 is incorporated in a reflective liquid crystal display device.
Figure 3B:
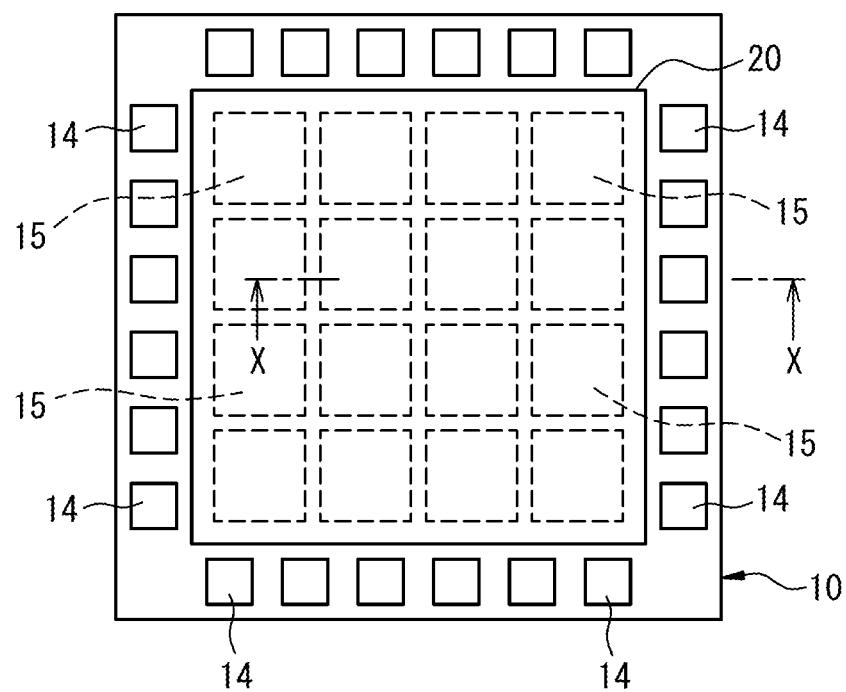
FIG. 3B is a top plan view of an LCOS unit.
Figure 4:
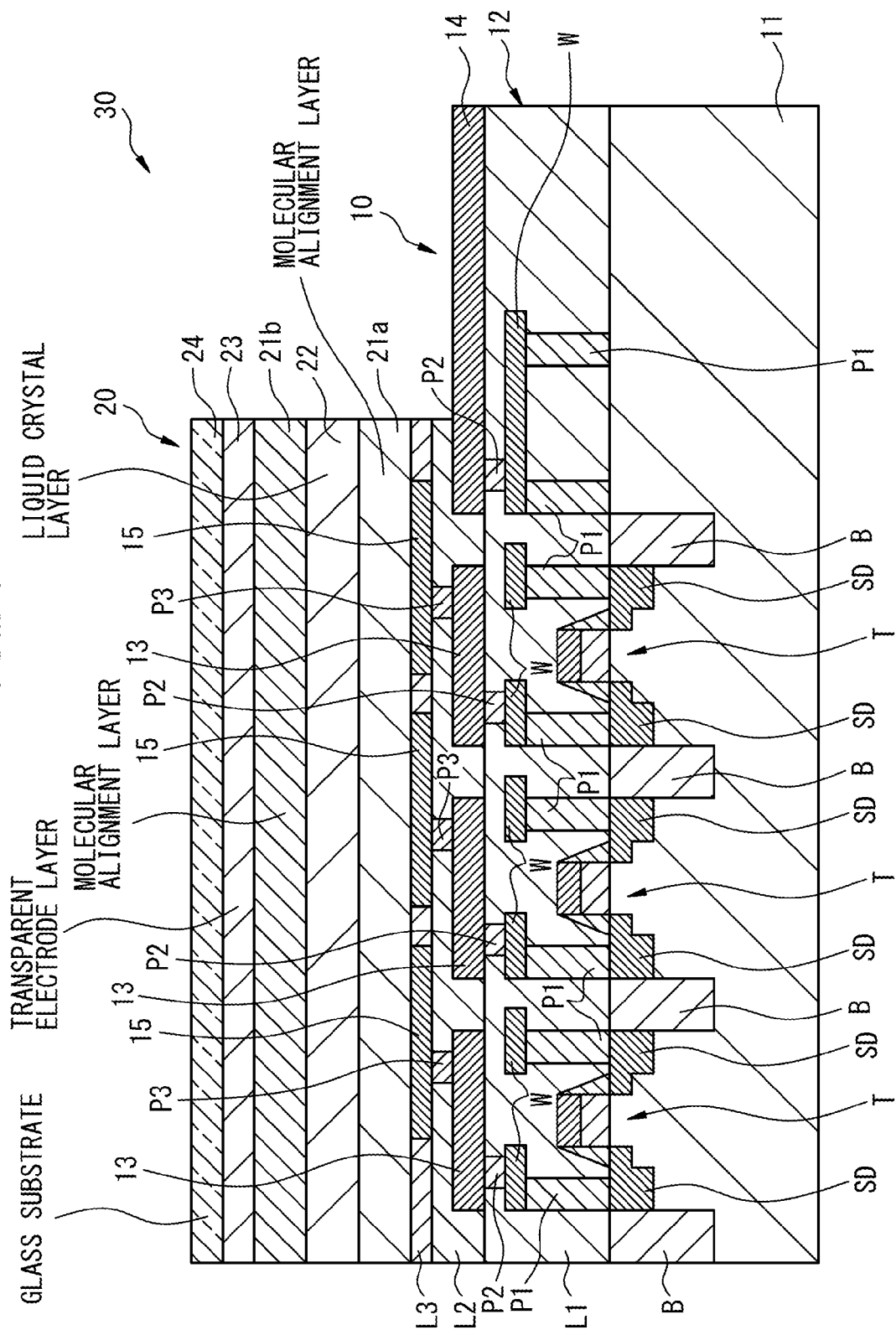
FIG. 4 is a diagram illustrating schematically an enlarged cross-sectional view taken along X-X in FIG. 3B.

FIG. 2 is a diagram illustrating one embodiment of the semiconductor device disclosed in this specification. FIG. 3A is a diagram illustrating a condition in which the semiconductor device depicted in FIG. 2 is incorporated in a reflective liquid crystal display device, and FIG. 3B is a top plan view of an LCOS unit. FIG. 4 is a diagram illustrating schematically an enlarged cross-sectional view taken along X-X in FIG. 3B.

The semiconductor device 10 of this embodiment is formed from a silicon chip, and is used to drive the liquid crystal panel of the reflective liquid crystal display device.

As illustrated in FIGS. 3A and 3B, the LCOS unit 30 is constructed by mounting the liquid crystal panel 20 on the semiconductor device 10.

The reflective liquid crystal display device 30a includes, in addition to the LCOS unit 30, a light source 41 having red, green, and blue light-emitting diodes, a polarizer 42, and an analyzer 43.

The semiconductor device 10 includes reflective electrode layers 15 arranged in a two-dimensional matrix array, and a device layer 12 which contains circuit elements such as transistors T for controlling the electric potentials of the reflective electrode layers 15. The reflective electrode layers 15 are arranged on the surface of the semiconductor device 10 that faces the liquid crystal panel 20.

The liquid crystal panel 20 includes a liquid crystal layer 22 sandwiched between a pair of molecular alignment layers 21a and 21b, a transparent electrode layer 23 disposed on top of the molecular alignment layer 21b, and a glass substrate 24 disposed on top of the transparent electrode layer 23. In the liquid crystal panel 20, liquid crystals are sealed in the liquid crystal layer 22 enclosed by the pair of molecular alignment layers 21a and 21b and a sealing member not depicted.

When a voltage is applied to one of the reflective electrode layers 15, an electric field is established across the liquid crystal sandwiched between the transparent electrode layer 23 and the reflective electrode layer 15, thus controlling the orientation of the liquid crystal.

As illustrated in FIG. 3A, the light emitted from the light source 41 passes through the polarizer 42 and emerges as polarized light with its plane of vibration oriented in one specific direction. The light emerging from the polarizer 42 passes through the liquid crystal panel 20 of the LCOS unit 30 and strikes the reflective electrode layer 15; then, the light reflected by the reflective electrode layer 15 again passes through the liquid crystal panel 20 and is directed toward the analyzer 43. For example, suppose that the liquid crystal panel 20 is a TN mode liquid crystal display; then, when no voltage is applied between the reflective electrode layer 15 and the transparent electrode layer 23, the plane of vibration of the light is twisted through a certain angle while the light reflected by the reflective electrode layer 15 is passing through the liquid crystal panel 20. On the other hand, when a sufficiently high voltage is applied between the reflective electrode layer 15 and the transparent electrode layer 23, the plane of vibration of the light remains virtually unchanged while the light reflected by the reflective electrode layer 15 is passing through the liquid crystal panel 20. Therefore, when the polarizer 42 and the analyzer 43 are arranged so as to block the light when no voltage is applied, the light is allowed to pass through when a voltage is applied. By controlling the voltage applied to each reflective electrode layer 15, a desired image can be projected for display.

The voltage to be applied to each reflective electrode layer 15 is supplied via a corresponding one of the transistors T contained in the device layer 12. Power and external signals are input and output to and from the device layer 12 via bonding pads 14.

As illustrated in FIG. 3B, the bonding pads 14 are terminal electrodes arranged around the periphery of the semiconductor device 10.

Further, as illustrated in FIG. 2, the transistors T are arranged, one in each device region defined by a device isolating layer B, on the silicon substrate 11 of the semiconductor device 10. The transistors T have source/drain regions SD on both sides of a channel region. A first plug P1 is disposed on each source/drain region SD. The first plug P1 electrically connects each source/drain region SD to a device wiring layer W.

The device layer 12 is a region that contains the transistors T having the source/drain regions SD, and other circuit elements not depicted. The device layer 12 includes a drive circuit which contains the transistors T and other circuit elements and which supplies signals to the reflective electrode layers 15. The potential of each reflective electrode layer 15 is controlled by the supplied signal.

A first insulating layer L1 is disposed on top of the silicon substrate 11. The first insulating layer L1 is formed on the silicon substrate 11 so as to bury the transistors T, the first plugs P1, and the device wiring layers W.

First electrode layers 13 as well as the bonding pads 14 are disposed on the first insulating layer L1.

The first electrode layers 13 are electrically connected via second plugs P2, device wiring layers W, and first plugs P1 to the respective source/drain regions SD.

Third plug P3 are disposed, one on each first electrode layer 13.

The bonding pads 14 are electrically connected via the respective second plugs P2, device wiring regions W, and first plugs P1 to the respective circuit elements such as transistors contained in the device layer 12.

A second insulating layer L2 is disposed over the first electrode layers 13. The second insulating layer L2 is formed on top of the first insulating layer L1 so as to cover the edge portions of the bonding pads 14. The third plugs P3 are disposed within the second insulating layer L2.

The reflective electrode layers 15 for reflecting the light incident from the side opposite to the device layer 12 are formed on the second insulating layer L2. Each reflective electrode layer 15 is electrically connected to a corresponding one of the first electrode layers 13 via the third plug P3 formed thereon.

The reflective electrode layers 15 are electrically connected via the respective third plugs P3, first electrode layers 13, second plugs P2, device wiring layers W, and first plugs P1 to the respective source/drain regions SD. Each transistor T supplies a voltage to the reflective electrode layer 15 via the first electrode layer 13.

The reflective electrode layers 15 are embedded in a third insulating layer L3 with their surfaces exposed to the outside. The light incident from the side opposite to the device layer 12 is reflected by the exposed surface of each reflective electrode layer 15.

When the reflective electrode layers 15 are miniaturized in order to enhance the resolution and brightness of the reflective liquid crystal display device, the thickness of the reflective electrode layers 15 may become, for example, as thin as about 130 nm.

On the other hand, the bonding pads 14 are formed in a different process step than the reflective electrode layers 15; therefore, the bonding pads 14 can be formed thicker than the reflective electrode layers 15 so as to have sufficient mechanical strength. For example, the bonding pads 14 can each be formed to have a thickness of about 360 nm. The fabrication process for the bonding pads 14 and the reflective electrode layers 15 will be described later.

The inner edge portion of each bonding pad 14 is covered with the second and third insulating layers L2 and L3, and the remaining portion is exposed to the outside. The exposed portion of the bonding pad 14 is connected to an external circuit by using bonding technology such as wire bonding.

According to the semiconductor device 10 of the present embodiment described above, each bonding pad 14 has sufficient mechanical strength.

Next, a first embodiment of a method for fabricating the above semiconductor device disclosed in this specification will be described below with reference to drawings.

Figure 5:
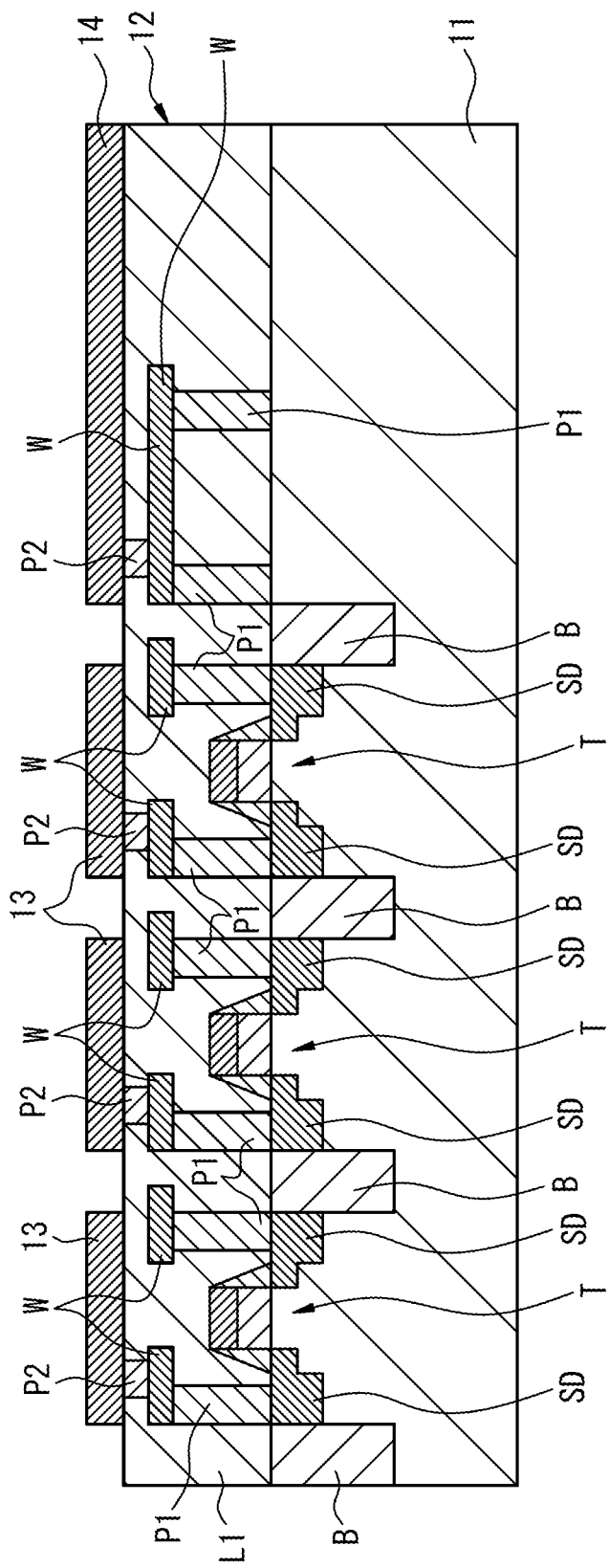
FIG. 5 is a diagram (part 1) illustrating a process step according to a first embodiment of a method for fabricating the semiconductor device disclosed in this specification.

First, as illustrated in FIG. 5, the device layer 12, the first electrode layers 13, and the bonding pad 14 are formed over the silicon substrate 11. The thickness of the bonding pad 14 can be determined so that the bonding pad 14 has sufficient mechanical strength. Since the first electrode layers 13 are formed with the bonding pad 14, the first electrode layers 13 have the same thickness as the bonding pad 14. The first electrode layers 13 and the bonding pad 14 are each formed to a thickness of 360 nm, for example, by using an aluminum alloy.

Figure 6:
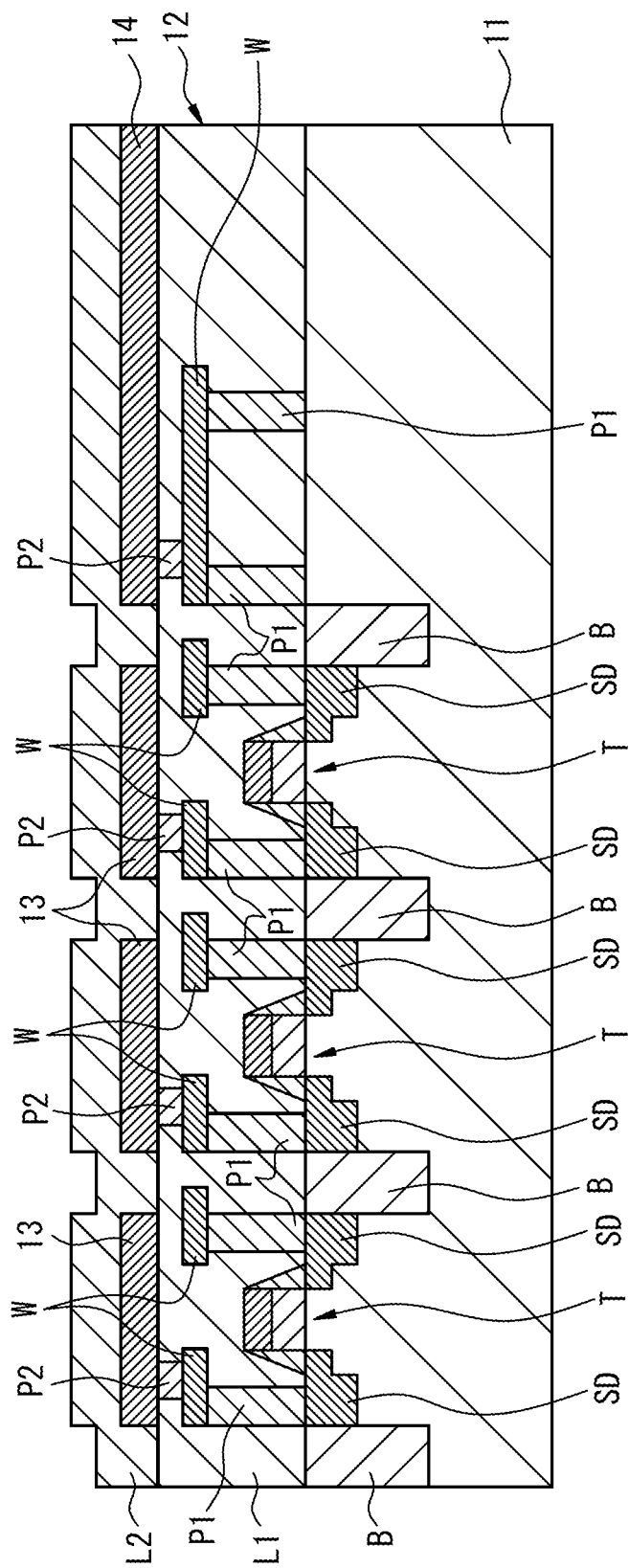
FIG. 6 is a diagram (part 2) illustrating a process step according to the first embodiment of the method for fabricating the semiconductor device disclosed in this specification.

Next, as illustrated in FIG. 6, the second insulating layer L2 is formed on top of the first insulating layer L1 so as to cover the first electrode layers 13 and the bonding pad 14. The second insulating layer L2 can be formed by using, for example, a high-density plasma CVD method. When the high-density plasma CVD method is used, a good quality insulating film can be formed at relatively low temperatures. As the material for forming the second insulating layer L2, use may be made, for example, of silicon oxide. The second insulating layer L2 may be formed, for example, to a thickness of 1100 nm.

Figure 7:
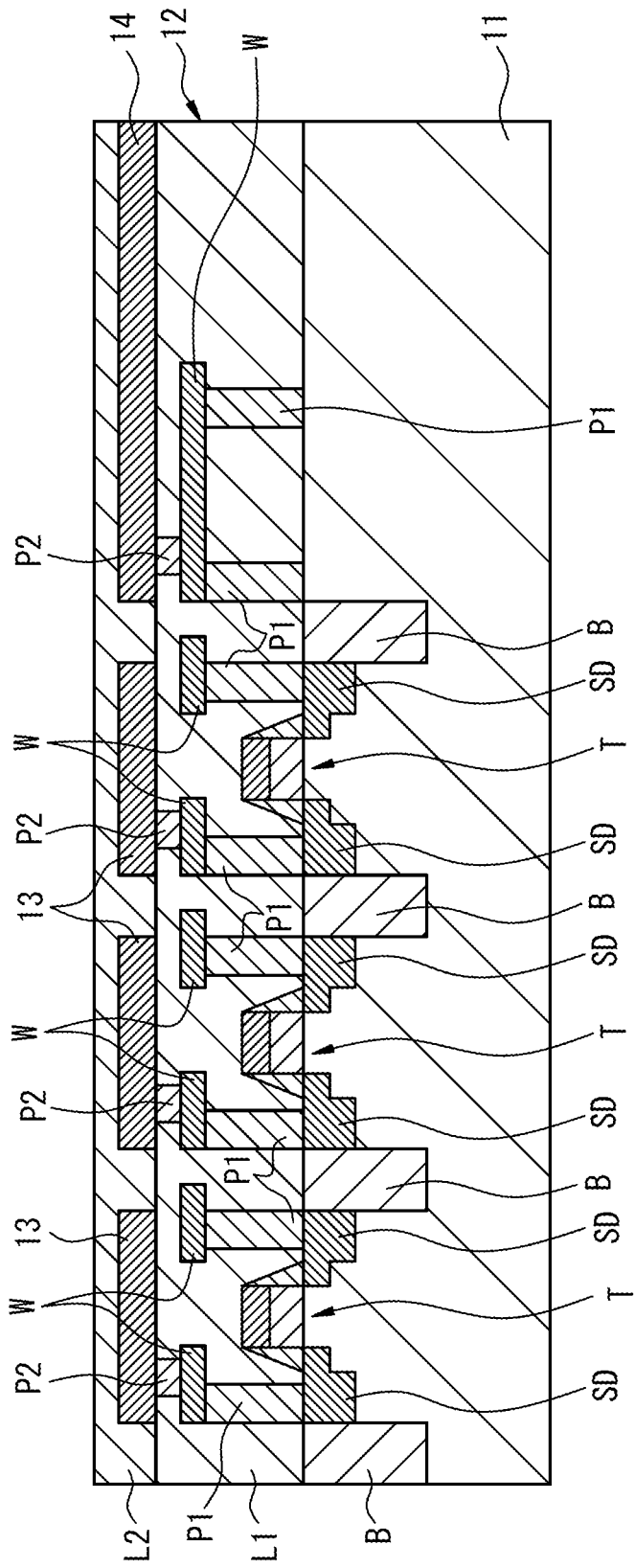
FIG. 7 is a diagram (part 3) illustrating a process step according to the first embodiment of the method for fabricating the semiconductor device disclosed in this specification.

Next, as illustrated in FIG. 7, the surface of the second insulating layer L2 is planarized. The reflective electrode layers 15 for reflecting the light incident from the side opposite to the device layer are each required to have a flat surface. Therefore, the surface of the second insulating layer L2 is planarized preparatory to the formation of the reflective electrode layers 15. As the method of planarization, use may be made, for example, of a chemical mechanical polishing (CMP) method. If the surface of the second insulating layer L2 is already sufficiently flat, the planarizing step may be omitted.

Figure 8:
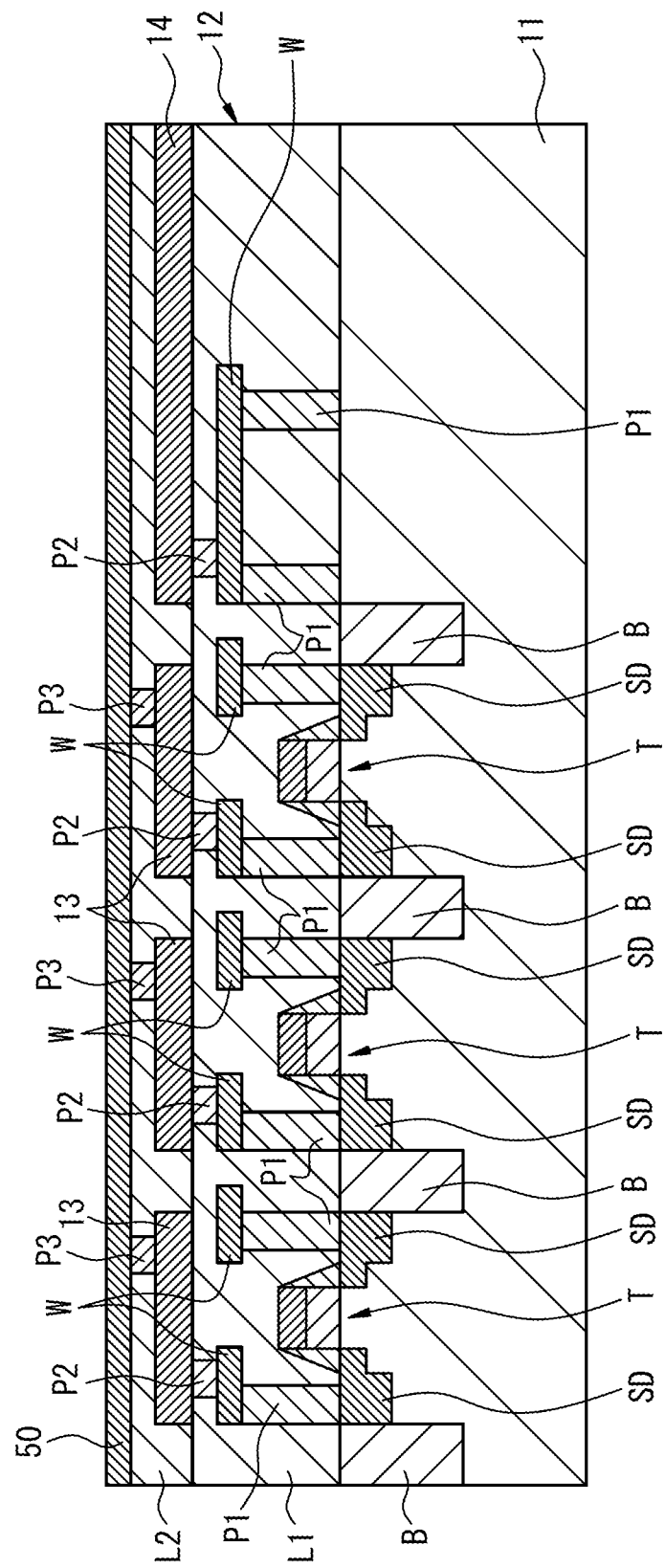
FIG. 8 is a diagram (part 4) illustrating a process step according to the first embodiment of the method for fabricating the semiconductor device disclosed in this specification.

Next, as illustrated in FIG. 8, an electrically conductive layer 50 is formed over the second insulating layer L2 in which the third plugs P3 have been formed. The conductive layer 50 is formed to a thickness of 270 nm, for example, by using an aluminum alloy. The third plugs P3 are each formed, for example, using tungsten.

The thickness of the conductive layer 50 can be determined appropriately according to the miniaturization technique used to form the reflective electrode layers 15. When reducing the dimensions of the reflective electrode layers 15 to be formed, the thickness of the mask used for patterning the conductive layer 50 is also reduced, so that the thickness of the conductive layer 50 is reduced in corresponding relationship with the thickness of the mask.

Figure 9:
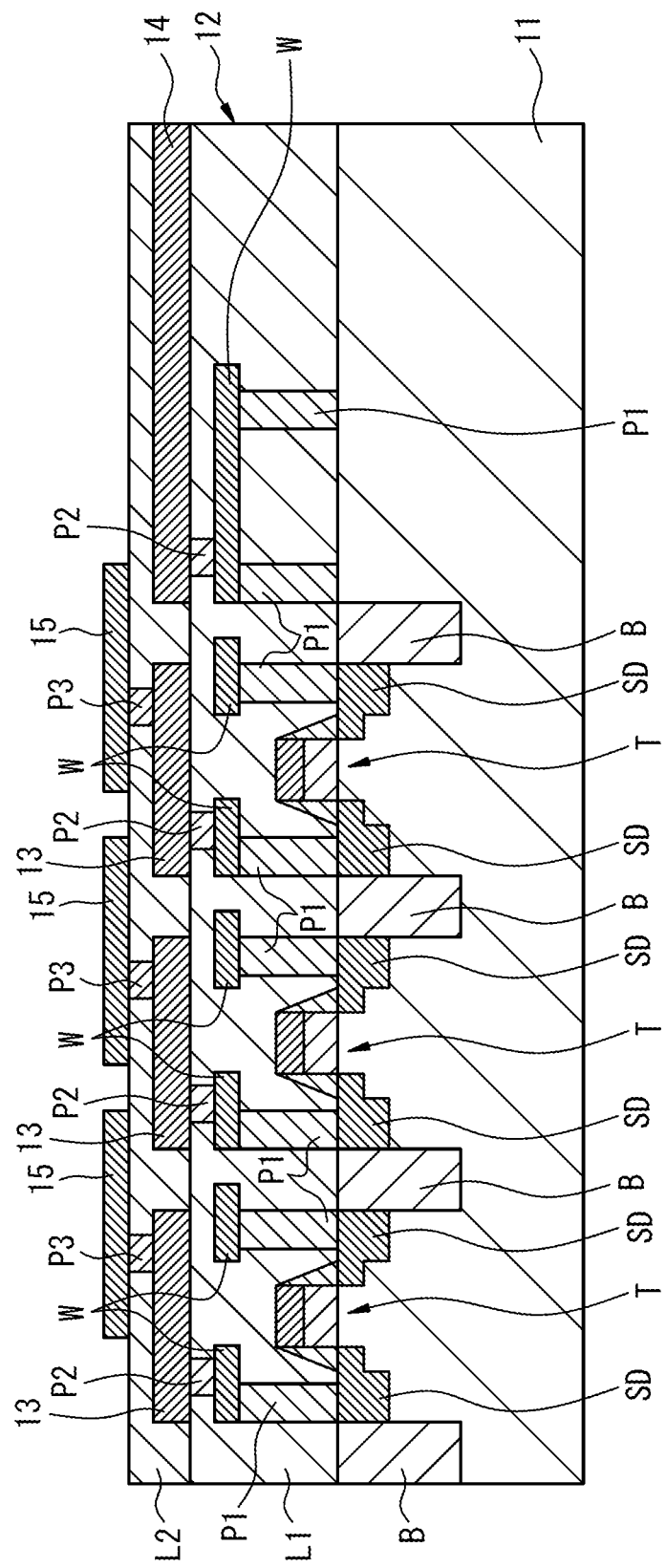
FIG. 9 is a diagram (part 5) illustrating a process step according to the first embodiment of the method for fabricating the semiconductor device disclosed in this specification.

Next, as illustrated in FIG. 9, using lithography and etching techniques, the conductive layer 50 is patterned to form the reflective electrode layers 15 each having a desired size.

Figure 10:
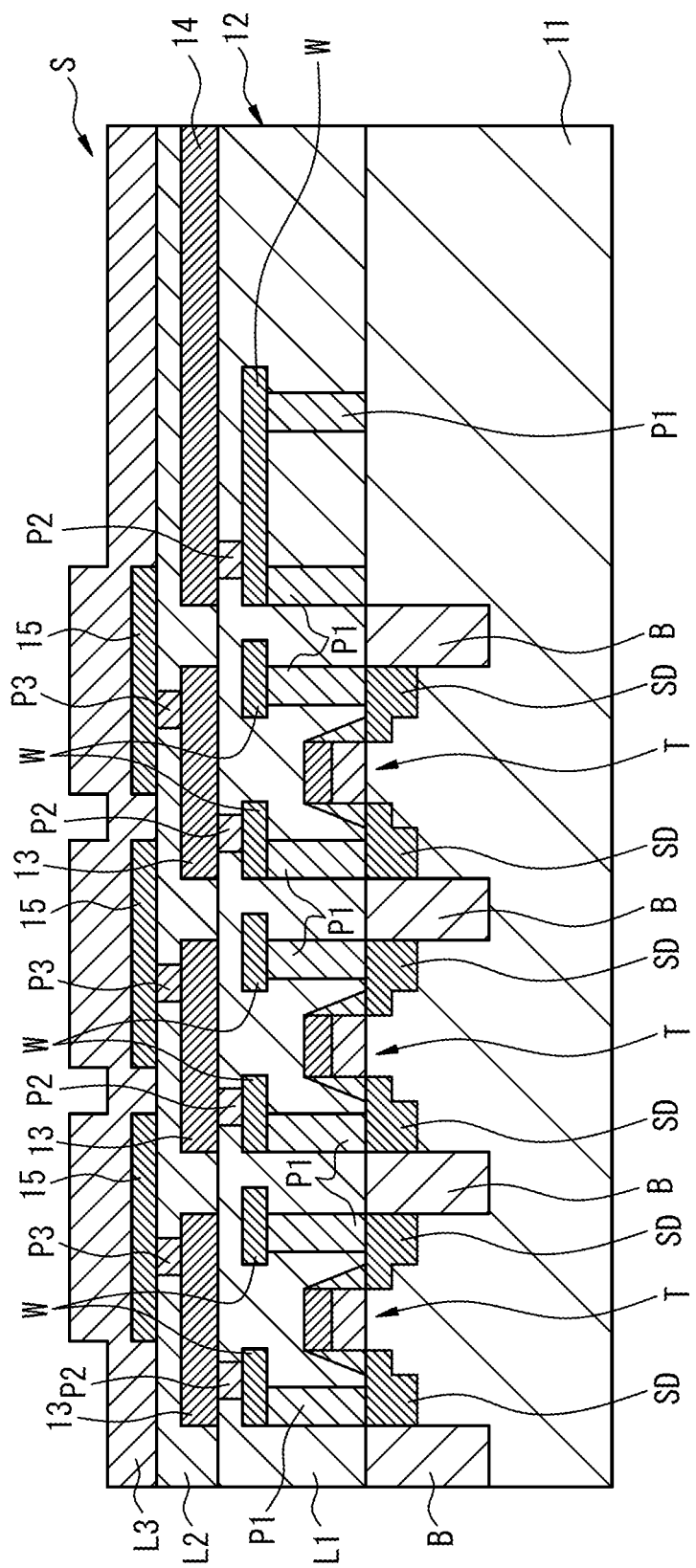
FIG. 10 is a diagram (part 6) illustrating a process step according to the first embodiment of the method for fabricating the semiconductor device disclosed in this specification.

Next, as illustrated in FIG. 10, the third insulating layer L3 is formed on top of the second insulating layer L2 so as to cover the reflective electrode layers 15, resulting in the formation of a stack structure S. The third insulating layer L3 is also formed on the portion of the second insulating layer L2 above the bonding pad 14. The third insulating layer L3 can be formed by using, for example, a high-density plasma CVD method. As the material for forming the third insulating layer L3, use may be made, for example, of silicon oxide. The third insulating layer L3 may be formed, for example, to a thickness of 700 nm.

Figure 11:
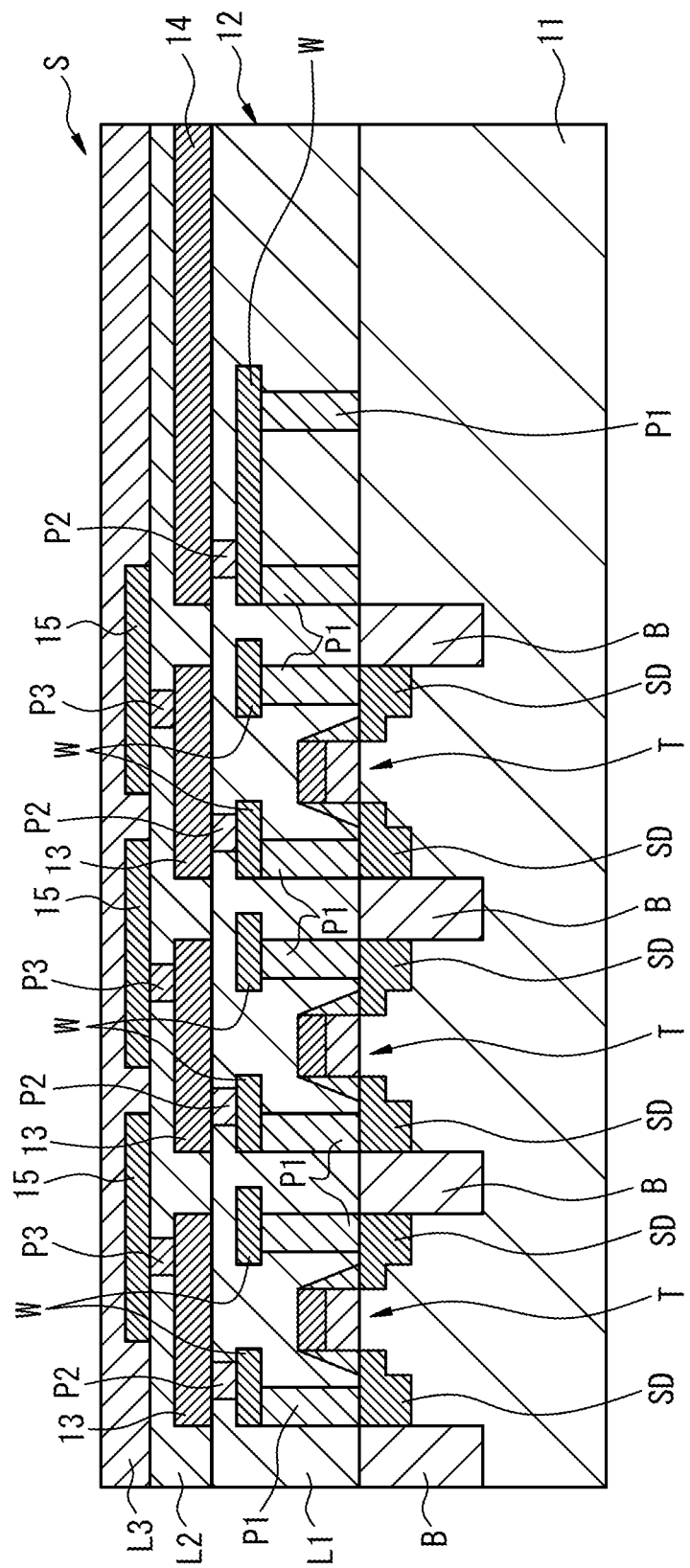
FIG. 11 is a diagram (part 7) illustrating a process step according to the first embodiment of the method for fabricating the semiconductor device disclosed in this specification.

Next, as illustrated in FIG. 11, the surface of the third insulating layer L3 is planarized. As the method of planarization, use may be made, for example, of a chemical mechanical polishing method.

Figure 12:
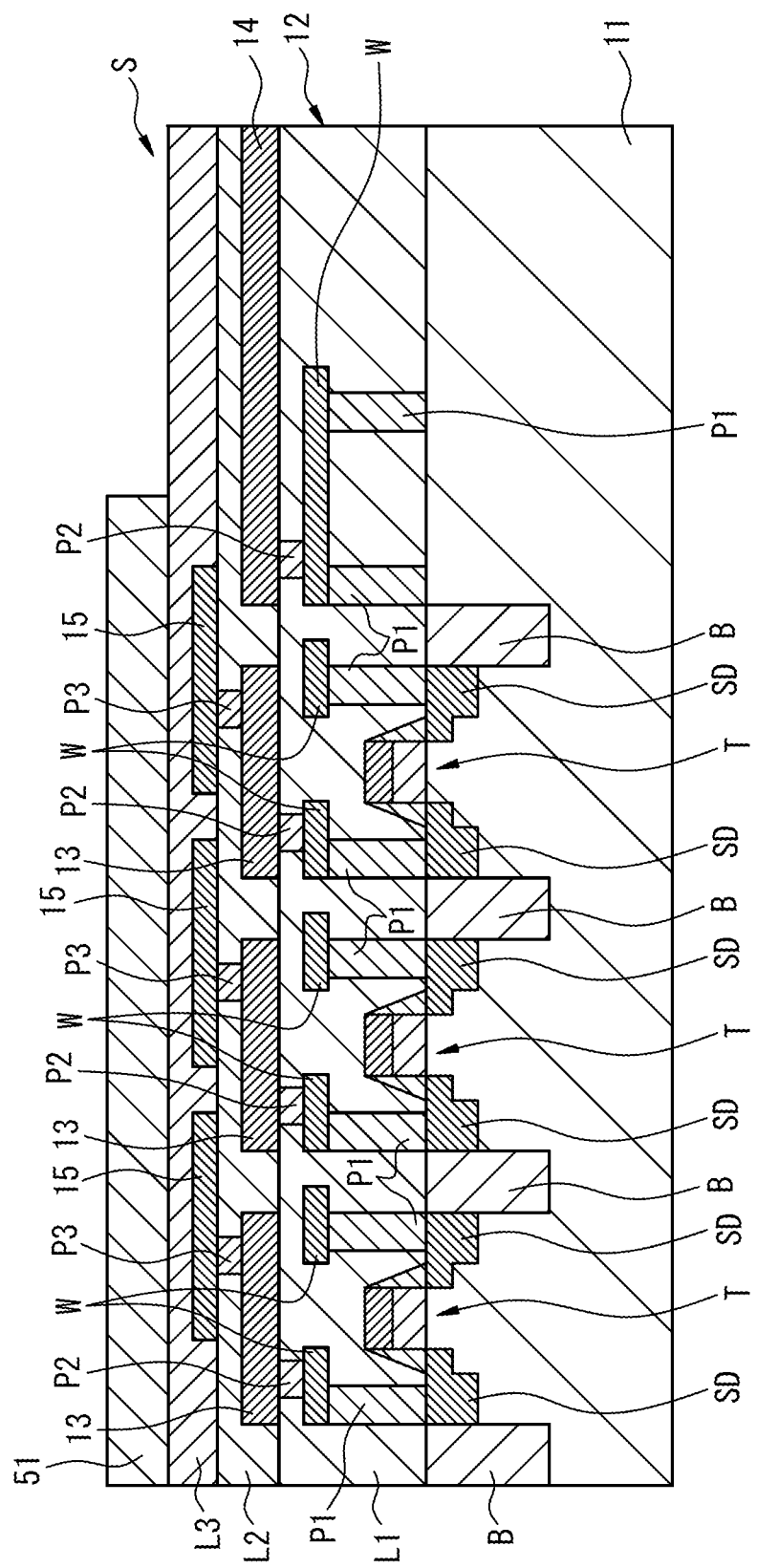
FIG. 12 is a diagram (part 8) illustrating a process step according to the first embodiment of the method for fabricating the semiconductor device disclosed in this specification.

Next, as illustrated in FIG. 12, a mask 51 is formed on the portion of the third insulating layer L3 that covers the reflective electrode layers 15. Since the mask 51 is used to etch off the portions of the second and third insulating layers L2 and L3 located above the bonding pad 14, the mask 51 is patterned so as to expose the portion of the third insulating layer L3 that is located above the bonding pad 14 to be exposed to the outside.

Figure 13:
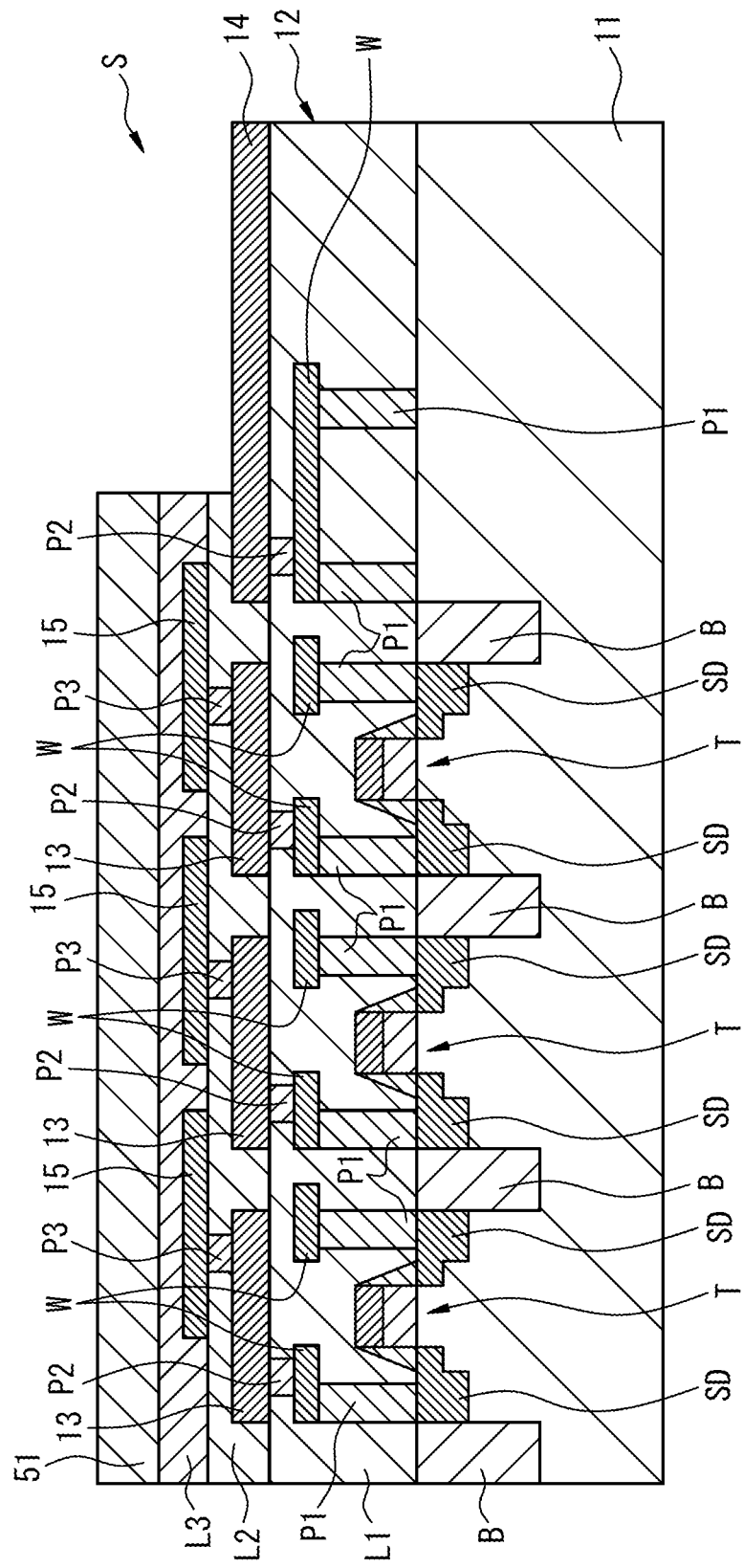
FIG. 13 is a diagram (part 9) illustrating a process step according to the first embodiment of the method for fabricating the semiconductor device disclosed in this specification.
Figure 14:
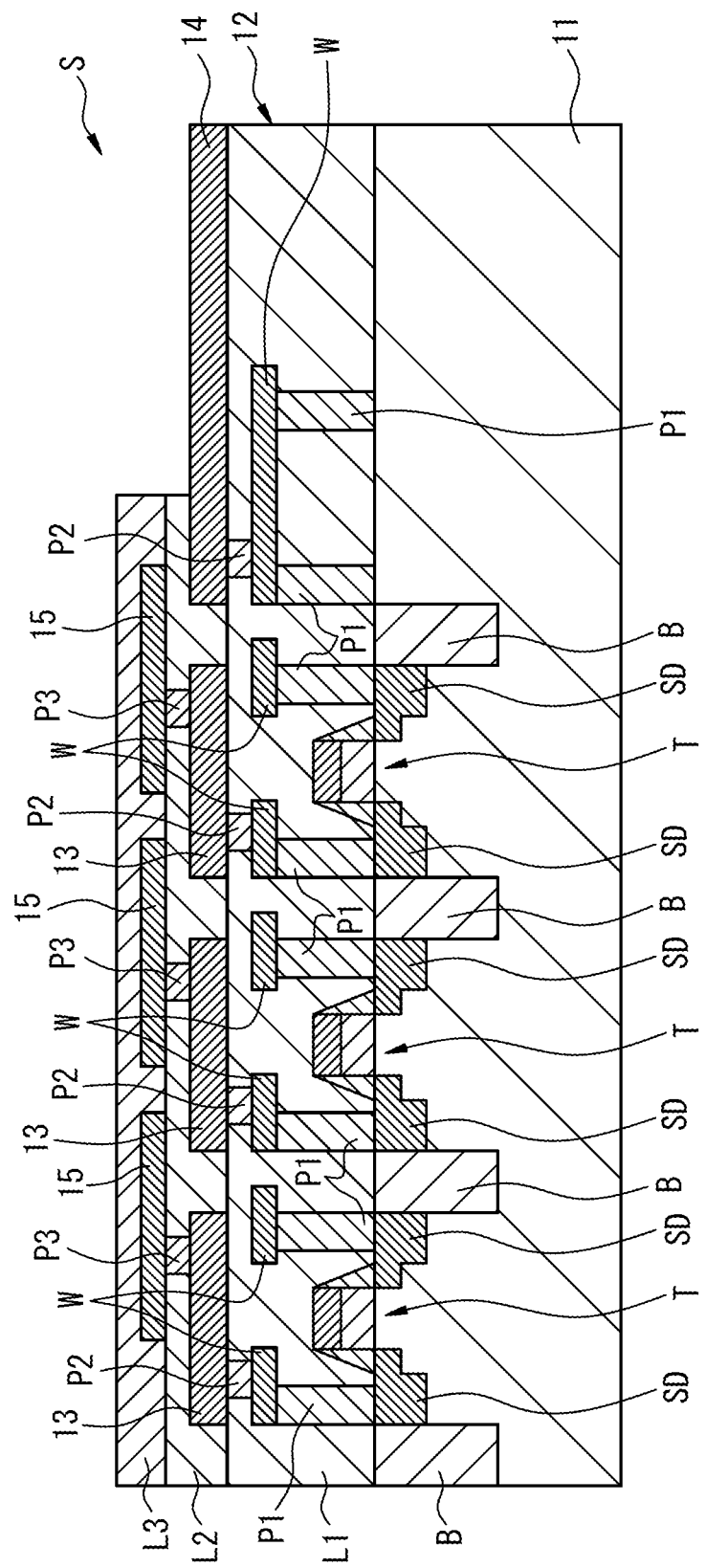
FIG. 14 is a diagram (part 10) illustrating a process step according to the first embodiment of the method for fabricating the semiconductor device disclosed in this specification.

Next, as illustrated in FIG. 13, using the mask 51, the portions of the second and third insulating layers L2 and L3 located above the bonding pad 14 are etched off, thereby externally exposing the bonding pad 14 on the stack structure S. Dry etching using a fluorine-based gas such as $CF_4$ or $CHF_3$, for example, may be used as the method of etching.

Next, the mask 51 remaining on the third insulating layer L3 is removed from the stack structure S.

Next, as illustrated in FIG. 2, the portion of the third insulating layer L3 that covers the reflective electrode layers 15 is etched off to expose the reflective electrode layers 15, completing the fabrication of the semiconductor device 10.

According to the semiconductor device fabrication method of the present embodiment described above, since the thickness of the bonding pad 14 can be determined independently of the reflective electrode layers 15, the bonding pad 14 formed on the semiconductor device 10 has sufficient mechanical strength.

Further, according to the present embodiment, since the etching for exposing the reflective electrode layers 15 is performed after performing the etching for exposing the bonding pad 14, the possibility of the surfaces of the reflective electrode layers 15 being damaged by the etching can be alleviated.

For example, if the etching for exposing the reflective electrode layers 15 is performed using the process steps hereinafter described, the surfaces of the reflective electrode layers 15 may be damaged by the etching.

Figure 15:
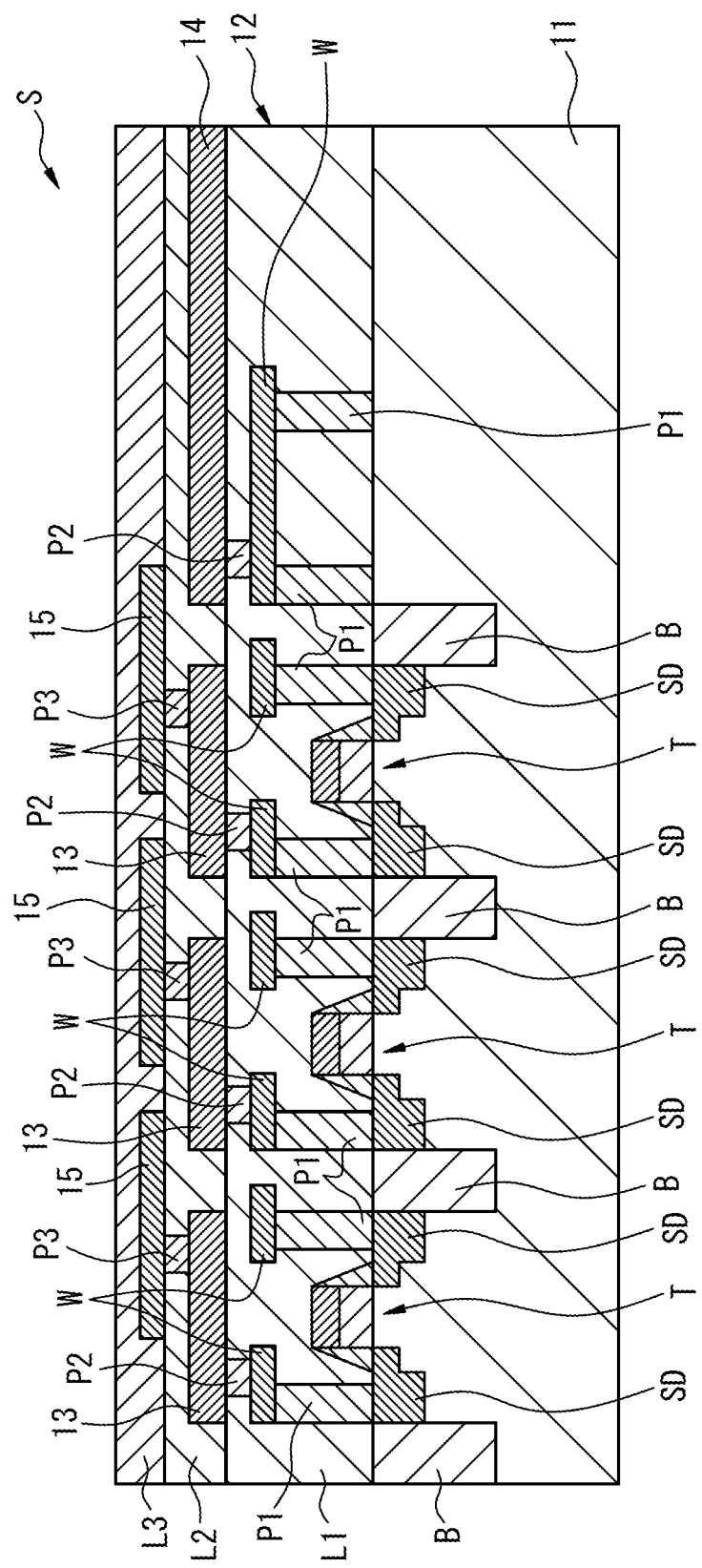
FIG. 15 is a diagram (part 1) illustrating a process step according to an alternative semiconductor device fabrication method.

First, as illustrated in FIG. 15, the stack structure S is formed by planarizing the surface of the third insulating layer L3. FIG. 15 is the same diagram as FIG. 11. The sequence of process steps up to the step depicted in FIG. 15 is the same as that of the foregoing first embodiment.

Figure 16:
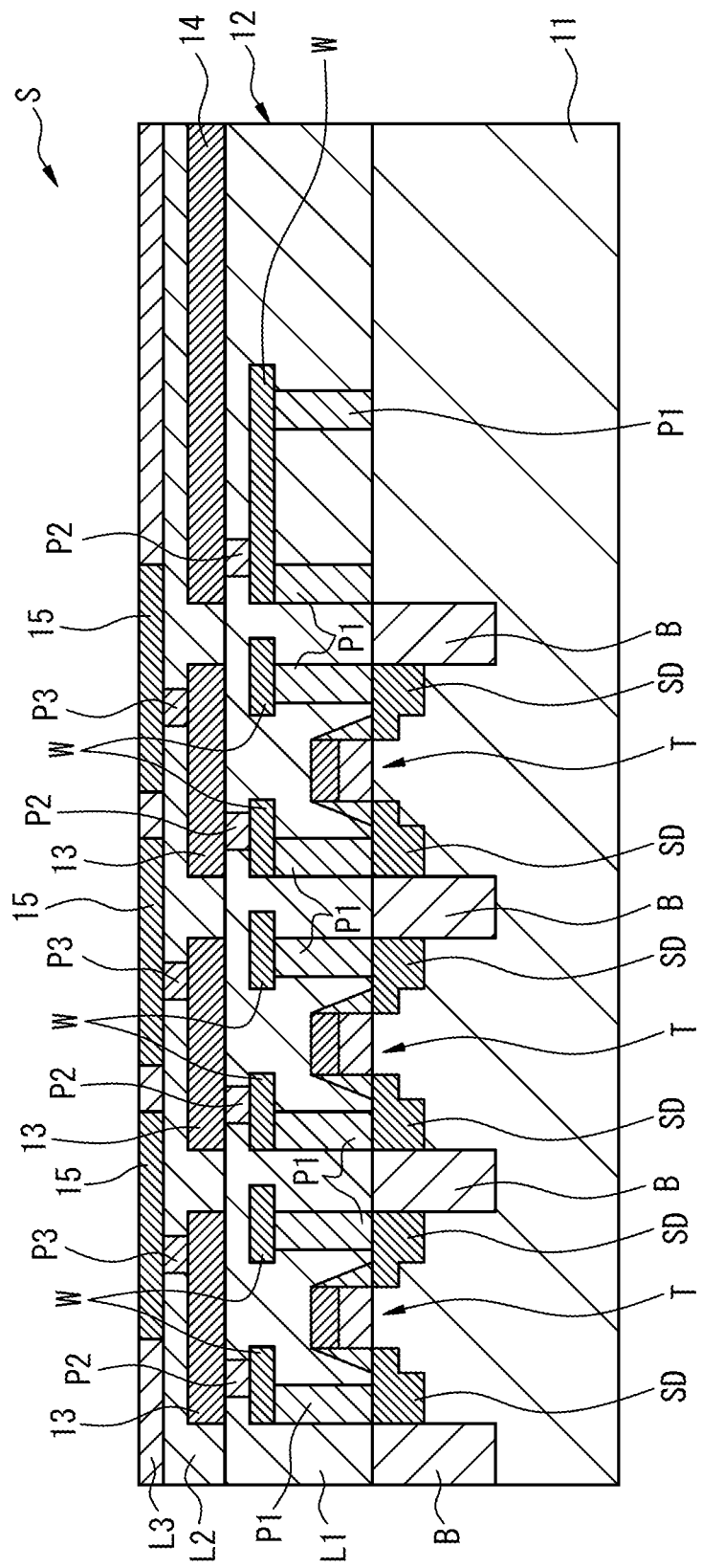
FIG. 16 is a diagram (part 2) illustrating a process step according to the alternative semiconductor device fabrication method.

Next, as illustrated in FIG. 16, the third insulating layer L3 is etched to expose the reflective electrode layers 15. After exposing the reflective electrode layers 15, cleaning is performed, using, for example, an amine-based solvent, to remove reaction products, etc. This cleaning process is only one example, and the cleaning may be performed using, for example, dry etching or other suitable process.

Figure 17:
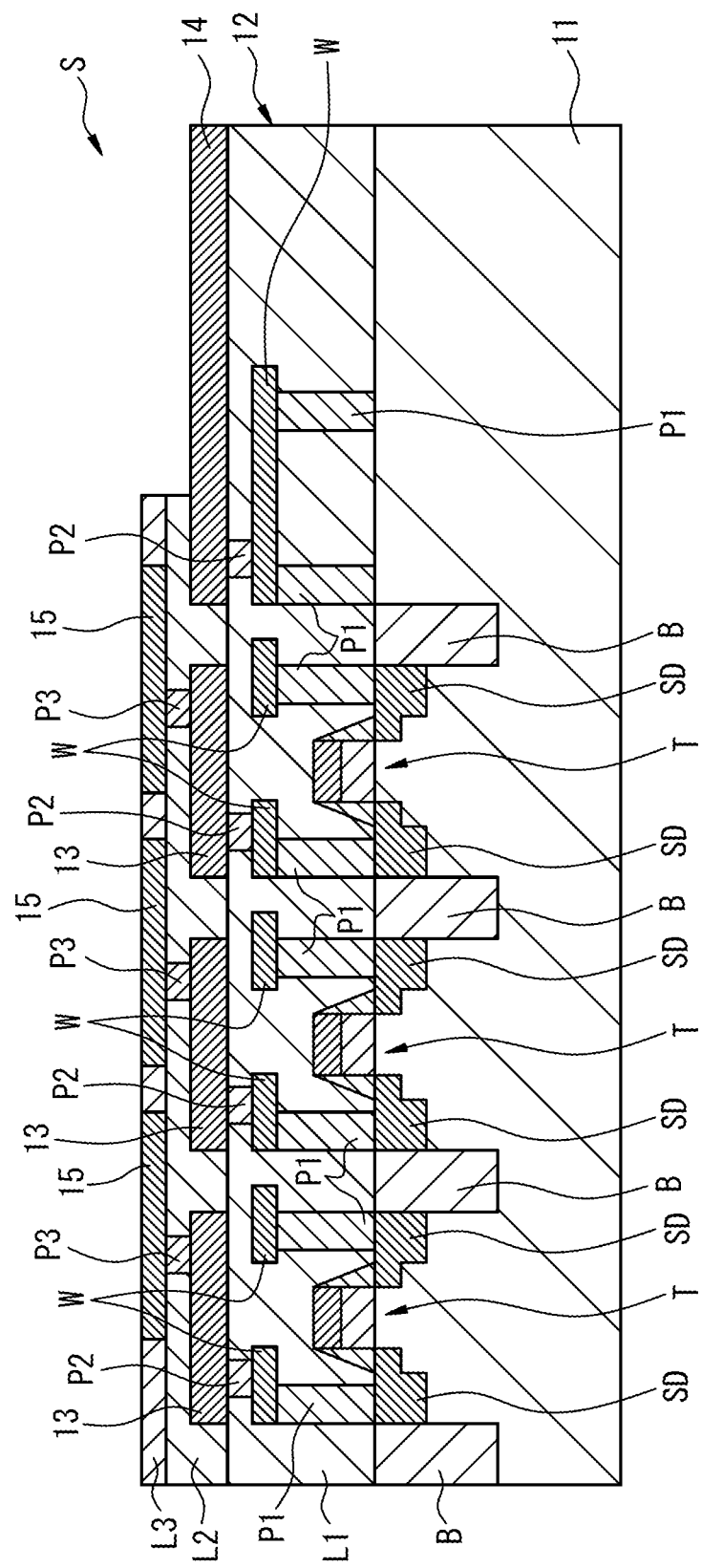
FIG. 17 is a diagram (part 3) illustrating a process step according to the alternative semiconductor device fabrication method.

Next, as illustrated in FIG. 17, a mask (not depicted) is formed on the portion of the third insulating layer L3 that covers the reflective electrode layers 15, and then, by using this mask, the portions of the second and third insulating layers L2 and L3 located above the bonding pad 14 are etched off to expose the bonding pad 14. Thereafter, the mask is removed. After removing the mask, cleaning is performed, using, for example, an amine-based solvent, to remove reaction products, etc. This cleaning process is only one example, and the cleaning may be performed using, for example, dry etching or other suitable process.

With the above process steps also, the semiconductor device having the same structure as that depicted in FIG. 2 can be obtained. However, the exposed surfaces of the reflective electrode layers 15 are cleaned a second time when exposing the bonding pad 14. The surfaces of the reflective electrode layers 15 thus subjected to the cleaning process twice may be damaged by the cleaning process.

On the other hand, according to the semiconductor device fabrication method of the present embodiment described above, the surfaces of the reflective electrode layers 15 are not yet exposed when performing the etching for exposing the bonding pad 14. Therefore, the surfaces of the reflective electrode layers 15 can be prevented from being damaged by the cleaning process that is performed after the bonding pad 14 has been exposed by etching.

Next, a second embodiment of a method for fabricating the semiconductor device disclosed in this specification will be described below with reference to drawings.

Figure 18:
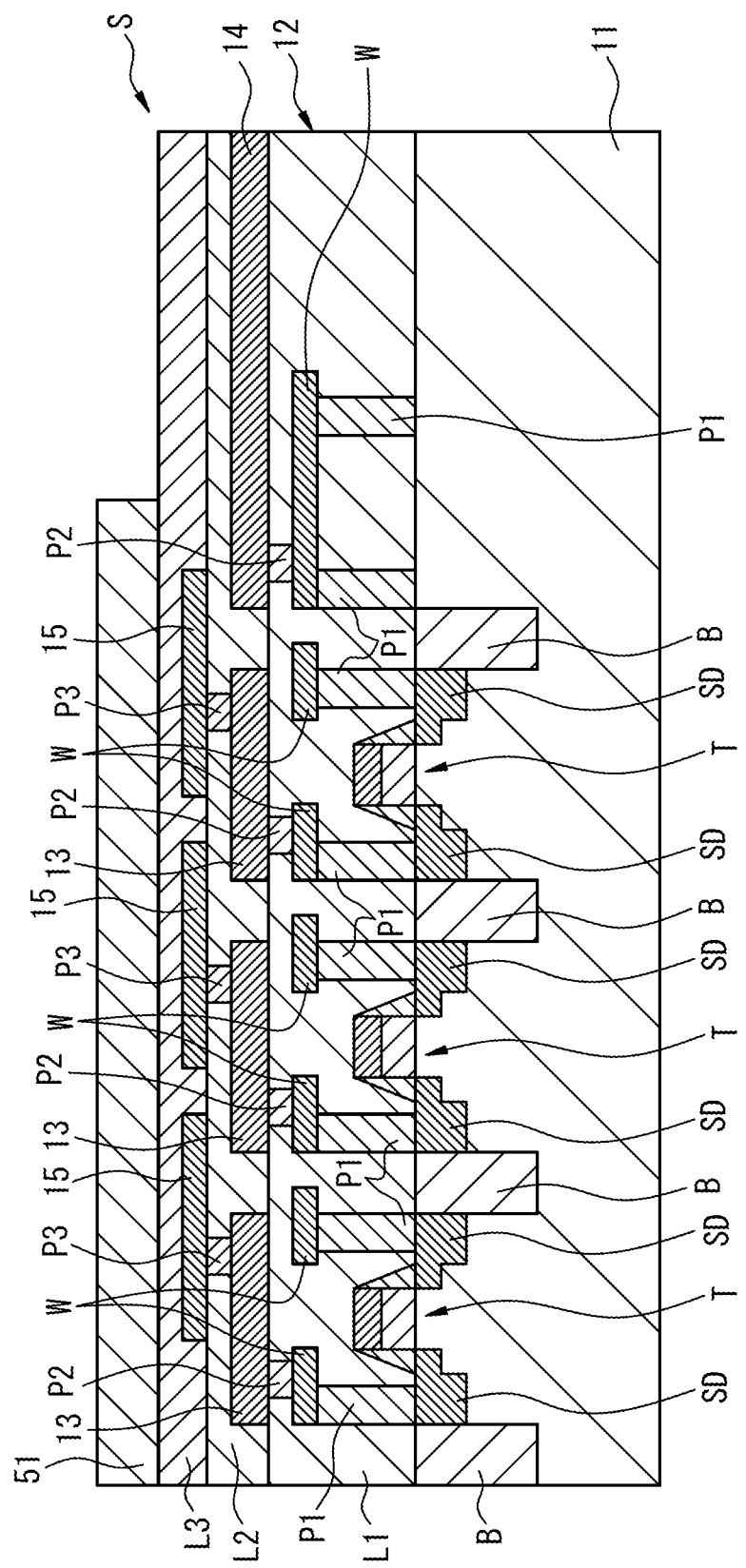
FIG. 18 is a diagram (part 1) illustrating a process step according to a second embodiment of a method for fabricating the semiconductor device disclosed in this specification.

First, as illustrated in FIG. 18, the mask 51 is formed on the portion of the third insulating layer L3 that covers the reflective electrode layers 15. FIG. 18 is the same diagram as FIG. 12. The sequence of process steps up to the step depicted in FIG. 18 is the same as that of the foregoing first embodiment.

Figure 19:
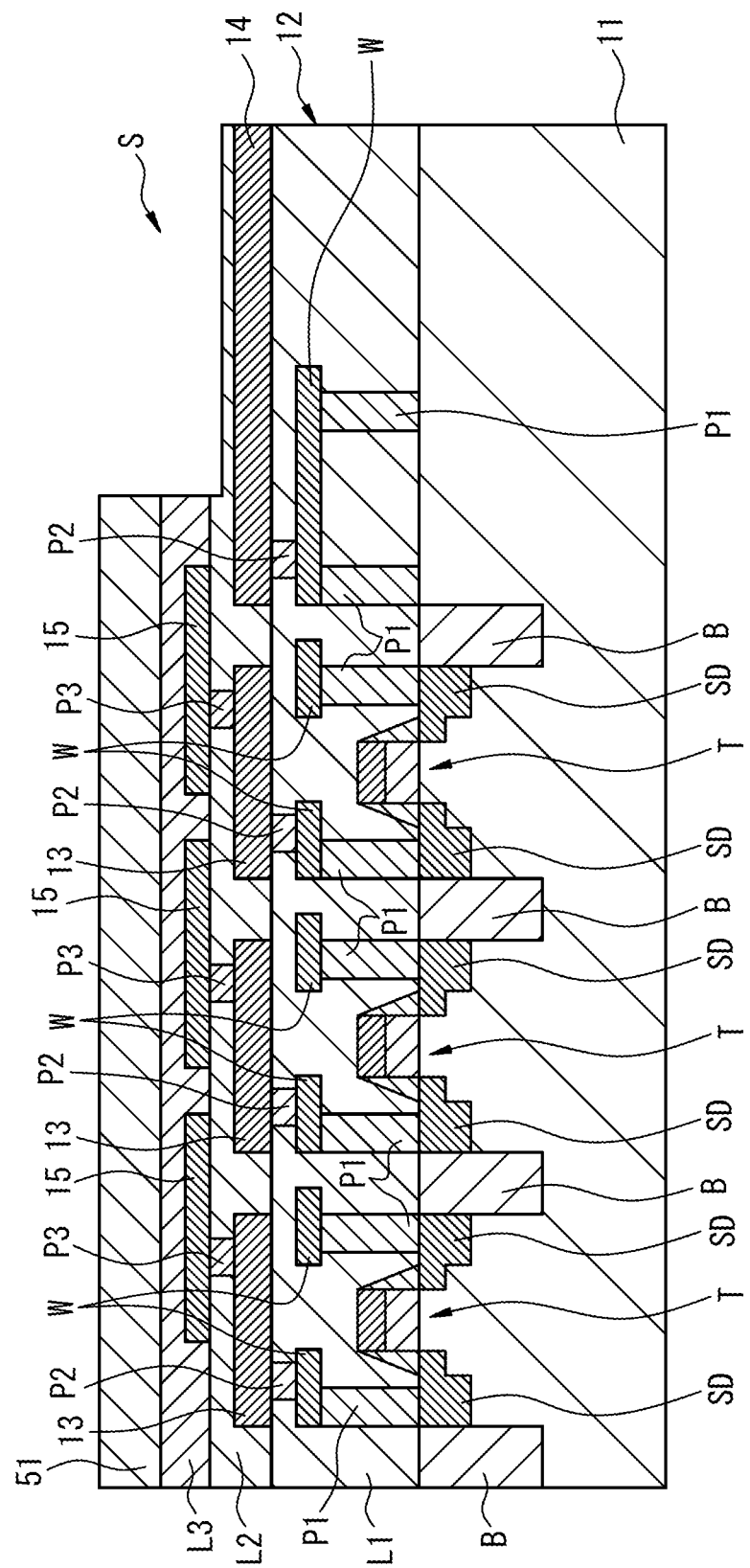
FIG. 19 is a diagram (part 2) illustrating a process step according to the second embodiment of the method for fabricating the semiconductor device disclosed in this specification.

Next, as illustrated in FIG. 19, using the mask 51, the entire portion of the third insulating layer L3 located above the bonding pad 14 is etched off while also etching the underlying second insulating layer L2 halfway down the depth thereof. Preferably, the thickness of the portion of the second insulating layer L2 remaining on the bonding pad 14 is not greater than the thickness of the portion of the third insulating layer L3 remaining on each reflective electrode layer 15. The reason for this is to ensure that the surfaces of the reflective electrode layers 15 will be exposed at the same time or after the bonding pad 14 is exposed when the third insulating layer L3 remaining on the reflective electrode layers 15 and the second insulating layer L2 remaining on the bonding pad 14 are etched in a subsequent step. In this way, the surfaces of the reflective electrode layers 15 can be prevented from being damaged by etching.

Dry etching using a fluorine-based gas such as $CF_4$ or $CHF_3$, for example, may be used as the method of etching.

Figure 20:
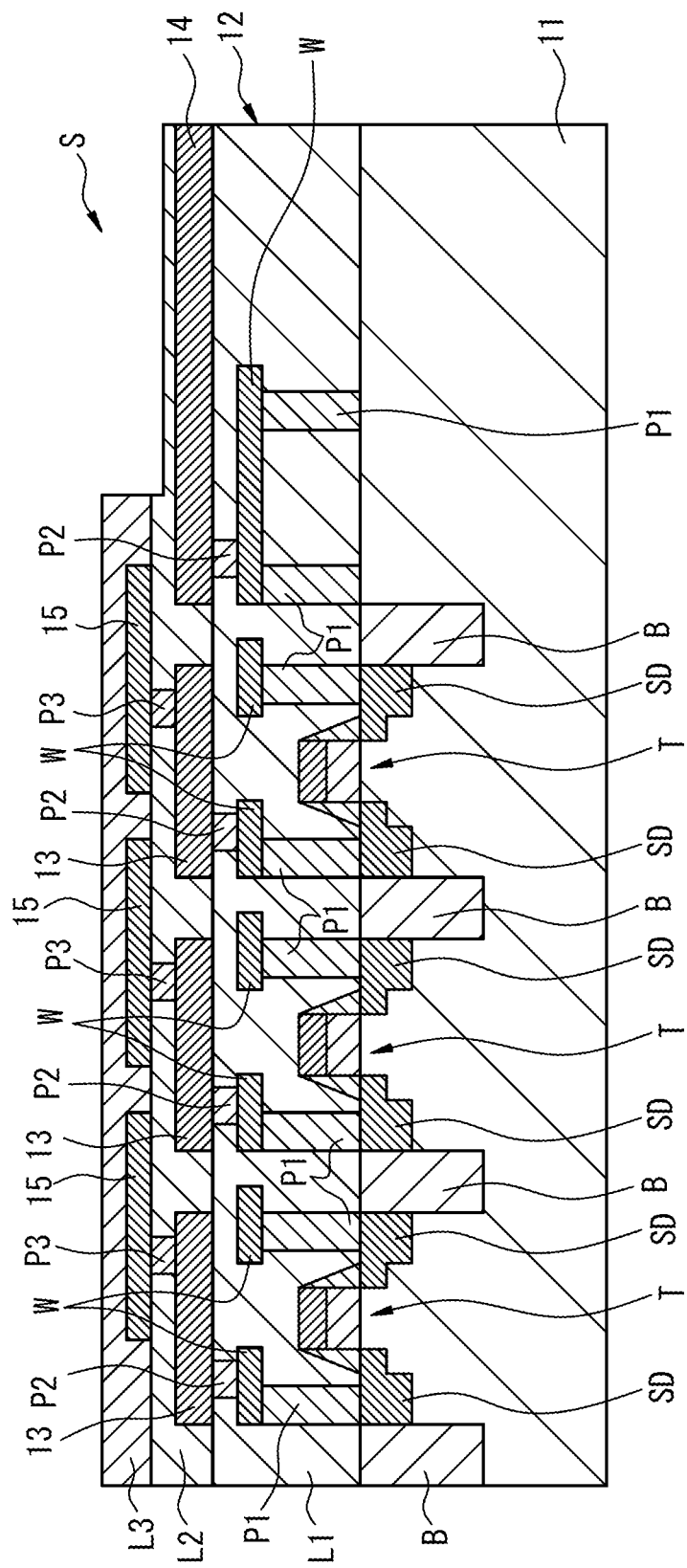
FIG. 20 is a diagram (part 3) illustrating a process step according to the second embodiment of the method for fabricating the semiconductor device disclosed in this specification.

Next, as illustrated in FIG. 20, the mask 51 remaining on the third insulating layer L3 is removed from the stack structure S.

Next, as illustrated in FIG. 2, the portion of the second insulating layer L2 remaining on the bonding pad 14 is etched off to expose the bonding pad 14, and at the same time, the portion of the third insulating layer L3 that covers the reflective electrode layers 15 is etched off to expose the reflective electrode layers 15. Preferably, the etching rate of the third insulating layer L3 is set not faster than the etching rate of the second insulating layer L2. By thus performing the etching so that the surfaces of the reflective electrode layers 15 will be exposed at the same time or after the bonding pad 14 is exposed, the number of times the surfaces of the reflective electrode layers 15 are subjected to cleaning can be reduced. This serves to alleviate the possibility of the reflective electrode layers 15 being damaged by cleaning.

Dry etching using a fluorine-based gas such as $CF_4$ or $CHF_3$, for example, may be used as the method of etching.

According to the semiconductor device fabrication method of the present embodiment described above, since the number of times the surface of the bonding pad 14 is subjected to cleaning can be reduced, the possibility of the surface of the bonding pad 14 being damaged by cleaning can be alleviated. The present embodiment also offers the same effect as that achieved by the semiconductor device fabrication method of the foregoing first embodiment.

In the present invention, the semiconductor device and the semiconductor device fabrication method according to any one of the above embodiments can be modified in various ways without departing from the spirit and scope of the invention. Further, the constituent features of any one embodiment can be applied to other embodiments where appropriate.

For example, in the embodiment of the semiconductor device described above, the thickness of the portion of the first insulating layer L1 on which the first electrode layers 13 are formed has been made the same as the thickness of the portion of the first insulating layer L1 on which the bonding pad 14 is formed, but these thicknesses may be made different.

Figure 21:
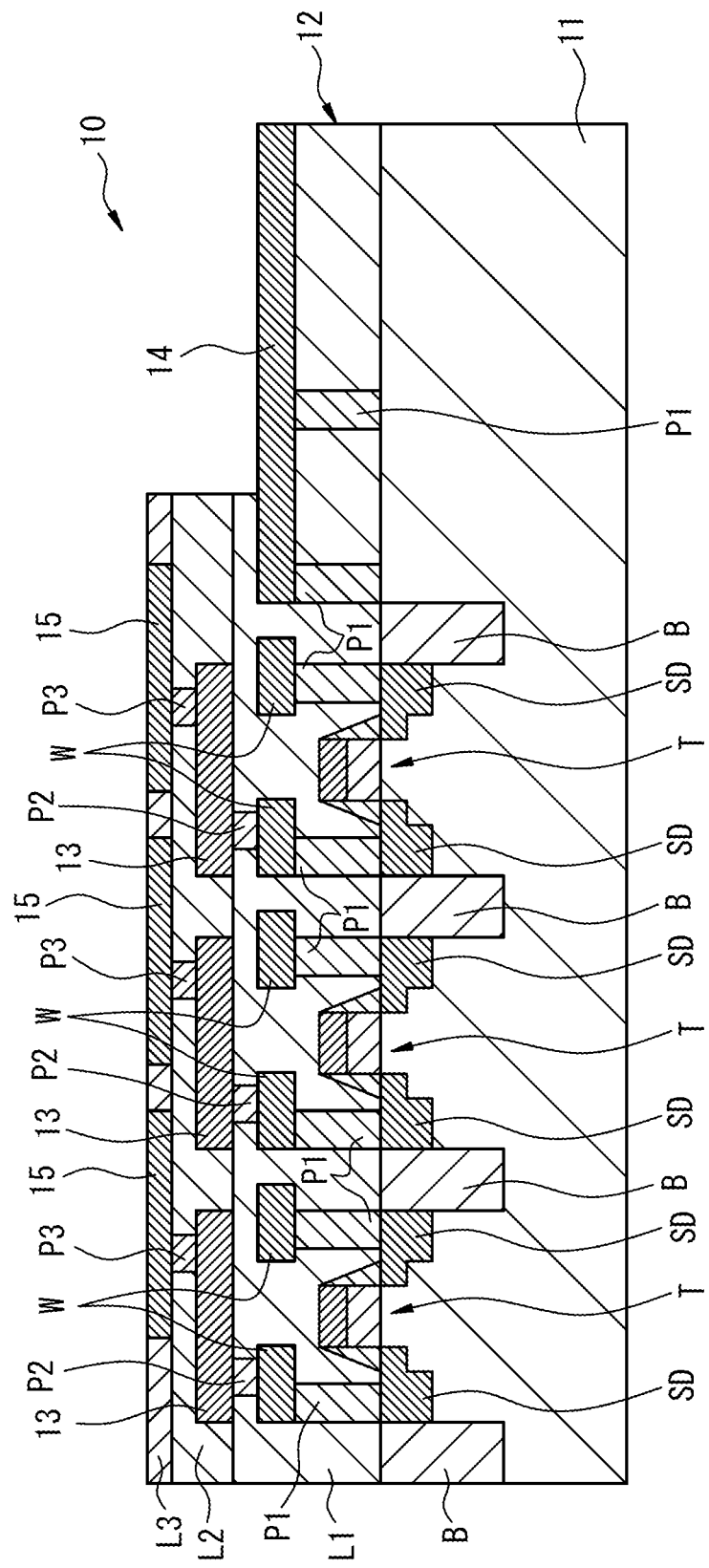
FIG. 21 is a diagram illustrating another embodiment of the semiconductor device disclosed in this specification.

FIG. 21 is a diagram illustrating another embodiment of the semiconductor device disclosed in this specification.

In the semiconductor device 10 depicted in FIG. 21, the portion of the first insulating layer L1 on which the first electrode layers 13 are formed is made thicker than the portion of the first insulating layer L1 on which the bonding pad 14 is formed. The bonding pad 14 is disposed at the same height as the device wiring layers W.

Since the bonding pad 14 is formed with the device wiring layers W in the same process step, the bonding pad 14 has the same thickness as the device wiring layers W. The thickness of the bonding pad 14 can be determined so that the bonding pad 14 has sufficient mechanical strength. The bonding pad 14 may be formed, for example, to a thickness of 700 nm.

Alternatively, the portion of the first insulating layer L1 on which the first electrode layers 13 are formed may be made thinner than the portion of the first insulating layer L1 on which the bonding pad 14 is formed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A semiconductor device fabrication method comprising:

forming a first electrode layer and a second electrode layer over a substrate;

forming a first insulating layer on the first electrode layer and second electrode layer;

forming a reflective electrode layer, that is electrically connected to the first electrode layer, on the first insulating layer;

forming a second insulating layer on the reflective electrode layer and a portion of the first insulating layer above the second electrode layer;

exposing the second electrode layer by etching the second insulating layer and the first insulating layer located above the second electrode layer with the second insulating layer left on the reflective electrode layer; and after exposing the second electrode layer, exposing the reflective electrode layer by etching the second insulating layer located on the reflective electrode layer.

2. A semiconductor device fabrication method comprising:

forming a first electrode layer and a second electrode layer over a substrate;

forming a first insulating layer on the first electrode layer and second electrode layer;

forming a reflective electrode layer, that is electrically connected to the first electrode layer, on the first insulating layer;

forming a second insulating layer on the reflective electrode layer and a portion of the first insulating layer above the second electrode layer;

etching the second insulating layer and a portion of the first insulating layer located above the second electrode layer in a depth direction, with the second insulating layer left on the reflective electrode layer; and after etching the portion of the first insulating layer, exposing the second electrode layer by etching the first insulating layer left on the second electrode layer, and exposing the reflective electrode layer by etching the second insulating layer located on the reflective electrode layer.

3. The semiconductor device fabrication method according to claim 2, wherein after etching the second insulating layer and the portion of the first insulating layer, a thickness of the first insulating layer remaining on the second electrode layer is equal to or less than a thickness of the second insulating layer left on the reflective electrode layer.

4. The semiconductor device fabrication method according claim 2, wherein in exposing the second electrode layer, and exposing the reflective electrode layer, the second insulating layer is etched at a rate equal to or slower than a rate at which the first insulating layer is etched.

5. The semiconductor device fabrication method according to claim 1, wherein the second electrode layer is arranged outside of the first electrode layer in planar view.

6. The semiconductor device fabrication method according to claim 2, wherein the second electrode layer is arranged outside of the first electrode layer in planar view.

* * * * *